(12) United States Patent
Tormasov

(10) Patent No.: US 8,463,871 B1
(45) Date of Patent: Jun. 11, 2013

(54) METHOD AND SYSTEM FOR DATA BACKUP WITH CAPACITY AND TRAFFIC OPTIMIZATION

(75) Inventor: Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 723 days.

(21) Appl. No.: 12/471,446

(22) Filed: May 25, 2009

Related U.S. Application Data

(60) Provisional application No. 61/056,084, filed on May 27, 2008.

(51) Int. Cl.
*G06F 15/173* (2006.01)

(52) U.S. Cl.
USPC .......................................................... 709/219

(58) Field of Classification Search
None
See application file for complete search history.

(56) References Cited

U.S. PATENT DOCUMENTS

| | | | |
|---|---|---|---|
| 6,802,025 B1 * | 10/2004 | Thomas et al. ................. | 714/15 |
| 7,454,592 B1 * | 11/2008 | Shah et al. ..................... | 711/216 |
| 7,529,785 B1 * | 5/2009 | Spertus et al. ........................ | 1/1 |
| 7,599,927 B2 * | 10/2009 | Lebrat .................................. | 1/1 |

OTHER PUBLICATIONS

"ADSL (Asymmetric Digital Subscriber Line)" Downloaded from <http://searchnetworking.techtarget.com/definition/ADSL>. Aug. 2000.*

* cited by examiner

*Primary Examiner* — Scott Christensen
(74) *Attorney, Agent, or Firm* — Bardmesser Law Group

(57) ABSTRACT

A method, system and computer program product for backing up client's data on remote data storage. A client-server infrastructure having multiple clients connected to the backup server is provided. There are two data storages devices connected to the server: data files repository and user data configurations repository. The data files repository contains copies of all data items (i.e., files) that had been stored by each client. The data files repository also contains a hash table with hash values corresponding to data items stored in the data repository. The file attributes corresponding to the data item are stored in the user data configurations repository. Further validation of files having identical hashes is performed on the client using file attributes. Backup of duplicate files is avoided.

34 Claims, 4 Drawing Sheets

METHOD AND SYSTEM FOR DATA BACKUP WITH CAPACITY AND TRAFFIC OPTIMIZATION

CROSS REFERENCE TO RELATED APPLICATIONS

This application is a non-provisional of U.S. Patent Application No. 61/056,084, filed on 27 May 2008, which is incorporated herein by reference in its entirety.

BACKGROUND OF THE INVENTION

1. Field of the Invention

The present invention is related to backing up user data on a server, and more particularly, to a method, system and computer program product for implementing data backup onto remote data storage with traffic and capacity optimization.

2. Background Art

A number of approaches to data back up are known in the art. One such an approach involves using hash values of data items (i.e., datanames) stored on a server.

This conventional method and system is illustrated in FIG. 1, depicting a typical network with a client-server infrastructure. The network also includes a remote data storage 124 coupled to the server. A client needs to transmit a data item 101 to the server for backup over the network. The dataname 112 for the data item 101 is created by applying a hash function 110 to the data item 101. Then the dataname 112 is sent to the server, where the datanames of all files stored in the data storage 124 are contained in the hash table 121 residing on the server. If a hash identical to the dataname 112 is located in the hash table 121, it is sent back to the client where the full comparison takes place (see block 114). If the client determines (see block 114) that the dataname 112 is equal to the dataname from the hash table 121 (i.e., it is found), then the process is finished in step 116 and the data item 101 is not transmitted, because, supposedly, an identical data item is already stored in the storage 124.

If the dataname 112 is not found in the hash table 121 (see step 114), then the data item 101 is transmitted to the server (see step 118) and is subsequently stored in the data storage 124. The corresponding dataname 112 generated on the client-side is also transmitted to the server in step 120. A dataname 122 is generated by processing the data item 101 through the hash function 110 on the server-side. The dataname 122 of the data item 101 generated on the server-side is compared against the dataname 112 of this data item generated on the client-side (see step 130). If the datanames 112 and 122 are the same (i.e., hash values are equal), then the transmission of the data item 101 has been executed correctly (see block 140). If the datanames 112 and 122 are not equal, then some data is lost during the transmission and the process of transmitting data item 101 is initiated again on the client.

Conventional file backup systems, like the one depicted in FIG. 1, have a number of shortcomings. Comparison of datanames (i.e., hash values) is performed on the server, which requires an extra transmission between the server and the client. Thus, resulting network traffic can be quite high. Also, the file verification used in the conventional methods relies solely on comparison of hash values, which can result in error, since there is always exists a probability of coincidence of hash values of different files. This probability depends on the length of hash values and can be reduced by using more complex hash functions that produce longer hash values. However, using such hush functions can increase the computational overhead significantly, which, in turn, makes the backup process quite costly.

Accordingly, there is a need in the art for a method, system and a computer program product for efficient data backup that reduces the traffic, increases capacity and provides more effective verification of data being backed up.

SUMMARY OF THE INVENTION

Accordingly, the present invention is related to a method, system and computer program product for implementing a data backup with traffic and capacity optimization that substantially obviates one or more of the disadvantages of the related art.

In particular, in one embodiment, there is provided a method, system and computer program product for backing up client data on remote data storage. In the exemplary embodiment a client-server infrastructure having multiple clients connected to the server is provided. There are two data storages devices connected to the server: data files repository and user data configurations repository. The storage devices can be located on the server. Both data storage devices can be combined in the same repository or the data files repository can reside on the server with the remote user data configurations repository being connected to the server.

The data files repository of exemplary embodiment contains copies of all data items (i.e., files) that had been stored by each client. The data files repository also contains a hash table with hash values corresponding to data items stored in the data repository. In the exemplary embodiment, a hash value can be used as a concise representation of a whole file or a portion of the file. For example, the hash value may be computed from a set of file attributes or memory representation of the file and/or disk image of the file. The file attributes corresponding to the data item are stored in the user data configurations repository. According to the exemplary embodiment, the hash values are used for validating the files and avoiding backup of duplicate files. However, unlike the conventional systems, in the exemplary embodiment the hashes are compared on the server side.

Another exemplary embodiment provides a method and system for backup of user file system tree structure using links to user files stored in a common storage area. Before the backup process is started the set of data files that are subject to backup is identified. At the same time the set of data files that are accessible by the server at any time is also identified on the backup server. Capacity optimization is achieved in this embodiment by transmitting the large data files from the server to the client for verification using fast transmission channel of an symmetric connection (such as, for example, ADSL).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
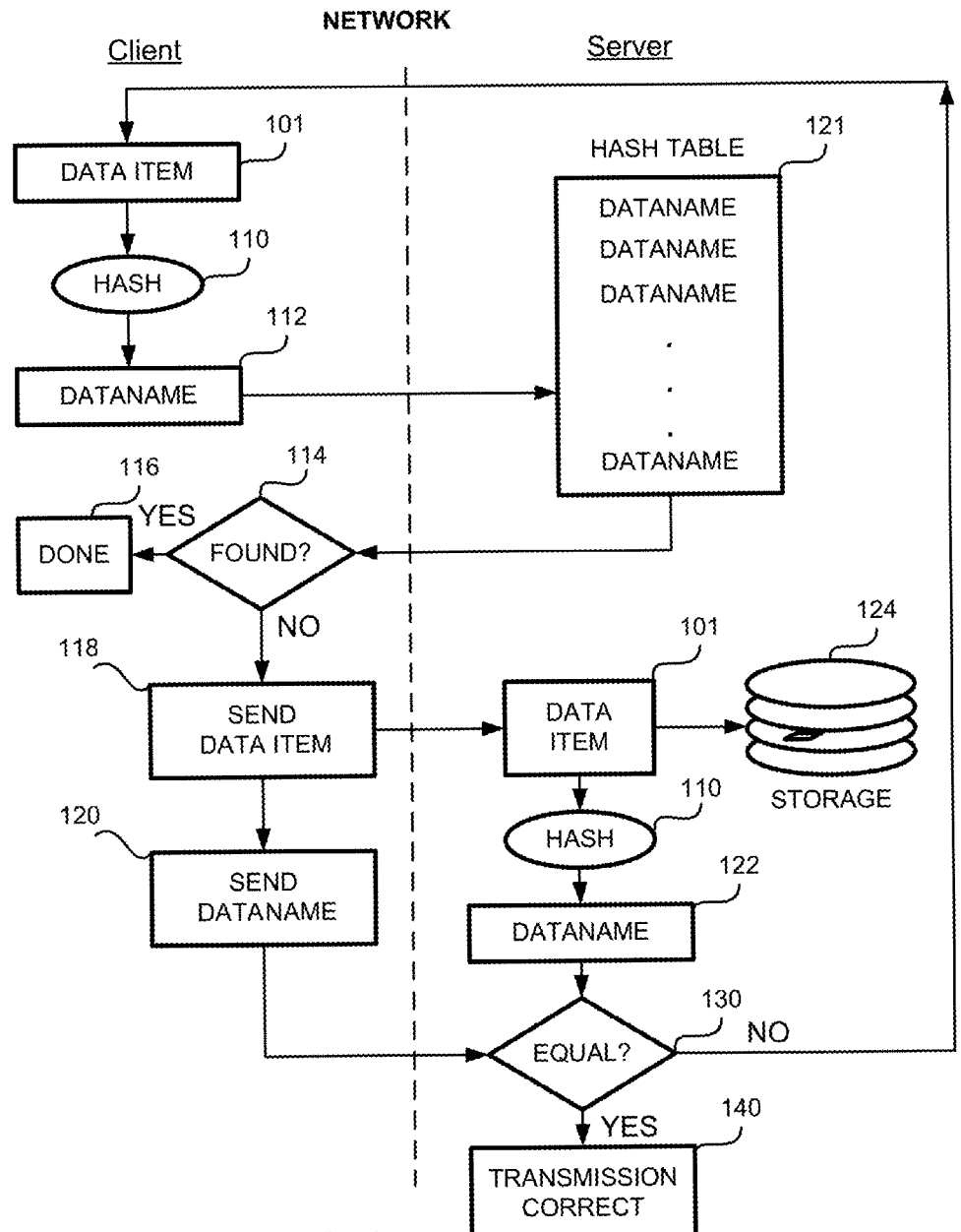
FIG. 1 illustrates a conventional method for transmitting and storing client data on a server.

Reference will now be made in detail to the preferred embodiments of the present invention, examples of which are illustrated in the accompanying drawings.

According to one embodiment, there is provided a method, system and computer program product for backing up client's data on remote data storage with traffic optimization. In an exemplary embodiment, a client-server infrastructure having multiple clients connected to the server is provided. Two data storages devices are connected to the server: a data files repository and a user data configurations repository. The storage devices can be located on the server. Both data storage devices can be combined in the same repository or the data files repository can reside on the server, with the remote user data configurations repository being connected to the server.

The data files repository of the exemplary embodiment contains copies of all data items (i.e., files) that had been stored by each client. The data files repository also includes a hash table containing hash values corresponding to data items stored in the data repository. In the exemplary embodiment, a hash value can be used as a concise representation of the whole file or a portion of the file. For example, a hash value can be computed from a set of file attributes or memory representation of the file and/or disk image of the file. The file attributes corresponding to the data item are stored in the user data configurations repository. According to the exemplary embodiment, the hash values are used for validating the files and avoiding backup of duplicate files.

Hash values or checksums can be calculated by applying a one-way function (such as hash function) to the file data. The hash values can provide a relatively accurate comparison of identity of data on the client and on the server. The checksums can be calculated, for example, by means of an algorithm of cyclic redundancy check (CRC) or a hash function, e.g., MD4, MD5, SHA1, SHA2, etc.

According to the exemplary embodiment, efficient backup of client data files into both of the repositories can be accomplished by taking in account all data received from all clients and stored in the data file repository. Data file associated with hash value contained in the hash table of the data file repository can be identical to the hash value associated with the data files that user tries to backup. In other words, this file is already located on the data storage device (including the case where the file belongs to other another user, but is the same file, such as many OS files, common application files, etc.).

In the exemplary embodiment, a special thumbnail (e.g., a CRC or a hash value) associated with the file data is sent to the server from the client. Transmission of a small data packet item, such as a CRC or a hash value, from the client to the server is particularly advantageous if the client has a slow upload data channel (e.g., an asymmetric connection, such as ADSL). In this case, the time required for transmitting the thumbnail is much shorter than the time required for transmitting the whole data file from a client to the backup server using a slow data channel.

The server looks for a requested data file by searching for a matching thumbnail in a thumbnail table. If the server finds the data file with matching thumbnail, then the server sends this data file back to the client for further comparison using a fast download data channel of an asymmetric connection.

The client compares the data file received from the server with its own data file that is subject to a backup. If the data files are identical, the client confirms this fact to the server and transmission of the data file to the backup server is not required. Transmission of data over the network channels is performed using discrete amounts of data (i.e., "packets"). Therefore, comparison of data files can be performed on the "packet-by-packet" basis on the client side.

This way, if the initial packets transmitted from server do not match the corresponding parts of the client's file, transmission of the subsequent packets can be aborted. Thus, a significant network traffic optimization can be achieved, especially if several files on the server have coinciding hashes.

Figure 2:
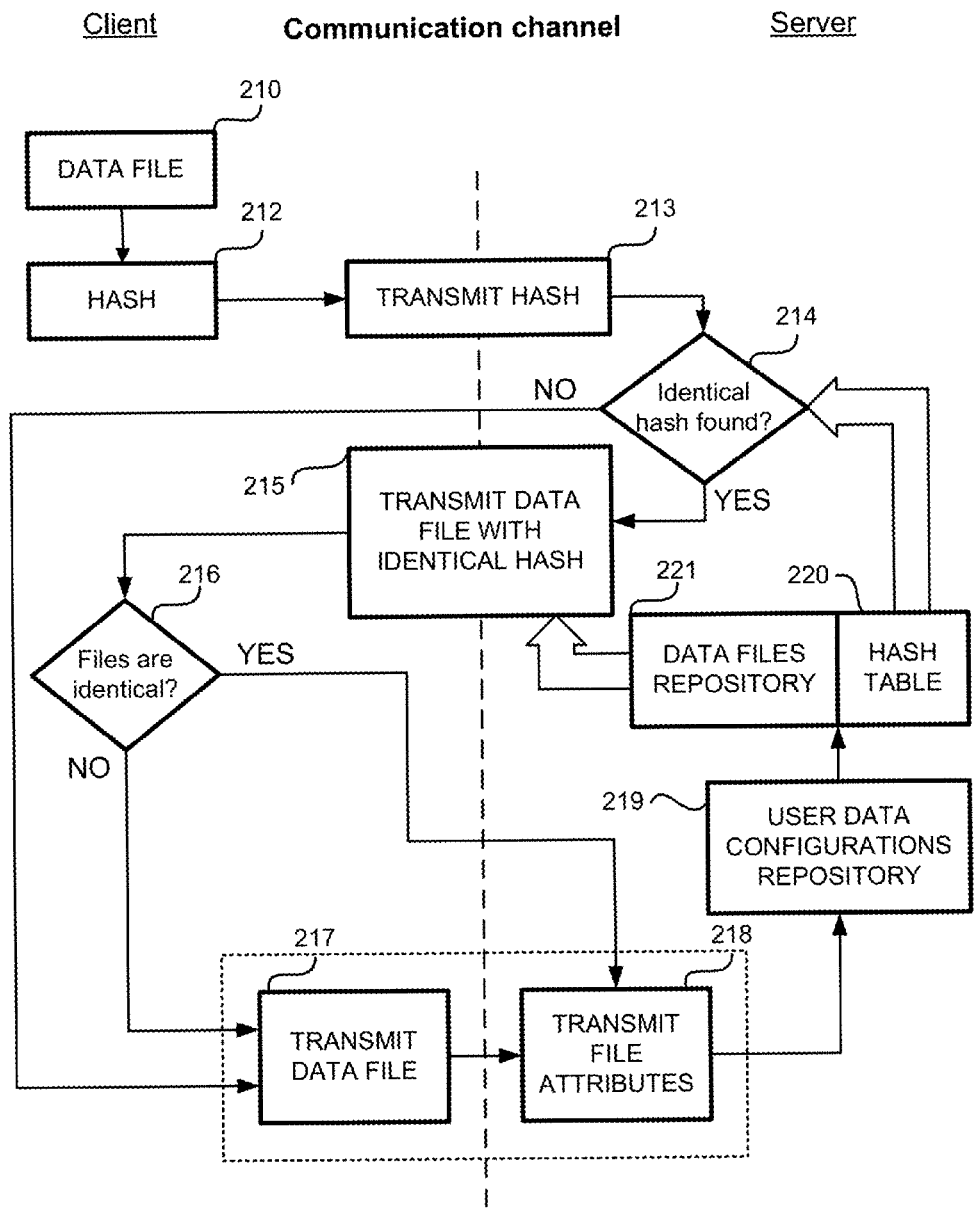
FIG. 2 illustrates a method for backing up data with traffic optimization in accordance with the exemplary embodiment.

A diagram of the method for data file backup with traffic optimization is depicted in FIG. 2. The client needs to backup a data file 210. A hash value 212 of the data file 210 is calculated. Then the hash value 212 is transmitted to the server (see block 214). The server receives the hash value 212 and looks up in the hash table 220 for a matching hash value that corresponds to the data file stored in the data files repository 221. Thus the hash value 212 is used to check whether the data files repository 221 contains a copy of the data file 210.

If a hash value matching the hash value 212 is not found on the server (see block 214), the client is notified and the data file 210 is transmitted to the server (see block 217) along with the file attributes (see 218). The data file 210 is stored in the data files repository 221 and the file attributes are stored in the user data configuration repository 219. When the data file 210 is stored in the data files repository 221, the hash value for this file is generated and stored in the hash table 220.

In some cases, several data files containing different data can have the same hash value. According to the exemplary embodiment, an additional identifier is assigned to each data file for determining whether the files are truly identical. This determination is performed on the client side. Thus, if a hash value matching the hash value 212 is found (see block 214), the corresponding to the hash value 212 file is pulled from the data files repository 221 and transmitted to the client (see block 215) using the fast data channel of the asymmetric connection.

The files are compared on the client side (see block 216) using file identifiers or on-the-fly on the "packet-by-packet" bases. If the files are identical, only the file attributes are transmitted to the backup server (see block 218) and stored in the user data configuration repository 219. If the files are found to be different in block 216, then the data file 210 is transmitted to the server (see block 217) along with the file attributes (see 218). The data file 210 is stored in the data files repository 221 and the file attributes are stored in the user data configuration repository 219. When the data file 210 is stored in the data files repository 221, the hash value for this file is generated and stored in the hash table 220.

It should be noted that client's storage required to be backed up can be backed up either on a logical or on a physical level. In case of a backup performed on a logical level the client's data storage tree is stored along with links to files having corresponding hashes being already uploaded to the server. In case of a physical backup, the links to the sets of blocks of the backed up image are used. These links point to blocks of previously uploaded files.

Another exemplary embodiment provides a method and a system for backup of user file system tree structure using links to user files stored in a common storage area. A common storage area is a storage structure available for at least read operations for each user. Users may be connected to a Local Area Network, a Wide Area Network or use virtual nodes on the same computer. In addition, a peer-to-peer networks or systems utilizing (N,K) algorithms (see, e.g., application Ser. No. 10/293,196, Filed: Nov. 13, 2002, incorporated herein by reference in its entirety), may be used, where common storage is available for number of users and is formed out of several users' storage areas. Users in this case may be the same user, may be completely different user, or may be partially the same users.

Before the backup process is started the set of data files that are subject to backup is identified. At the same time the set of data files that are accessible by the server at any time is also identified on the backup server. Capacity optimization is achieved in this embodiment by transmitting the large data files from the server to the client for verification using fast transmission channel of an asymmetric connection (such as, for example, ADSL).

The main advantage of this exemplary embodiment can be realized in a client-server system where a client computer and a backup server are connected via a network with an asymmetric connection (e.g., via Internet). The backup server is able to access a large amount of data files including distributed components from which software means can be installed or extracted (such as, for example, ISO images, CAB archives, MSI files, etc.).

The backup procedure, in accordance with the exemplary embodiment, can include the following steps:

(1) identifying a set of data files on the client that are subject to a backup;

(2) identifying from the set of files that are subject to the backup, where the files that can be accessed by the server at any time; (i.e., the files stored on the server, for example, on the server's hard disk, as well as the files residing on other machines connected to the server). Thus, the data files can be requested from the server by the client directly or client's request can be redirected to other clients connected to the server.

It should be noted that it is preferable to have the files identical to user files stored on the server permanently (e.g., common OS files, application files, etc.). However, depending on the speed required for restoration of the files or other factors such as, for example, server's hard disk drive storage capacity, the data files can be stored on the local network of the server or on a removable storage (i.e., removable hard drive, DVD or the like).

The backup procedure further includes:

(3) transmitting from the client to the server the files that cannot be accessed by the server;

(4) transmitting file related information of the client's file to the server (for client's computer restoration if the client's data gets corrupted);

(5) detecting the data file corresponding to the client's file related information among the data files stored on the server;

(6) comparing the client's and the server's file-related information on the server;

7) if the client's file-related information coincides with the server's file-related information, then the server's data file is transmitted to the client and on the client, comparison of the server's data file with the client's file is performed. If both files are identical, the client's data file is marked as "stored" on the server;

8) if the server's data file differs from the client's data file or the server's data file has not been detected on the client, the client's data file is transmitted to the server for backup.

In order to provide security, both files can be encrypted and compared in a blind manner, preventing other users from viewing the contents of the file received from the server. The backup server of the exemplary embodiment also provides for a backup of a user file system tree structure, with some links to user files being stored in a common storage area.

Figure 3:
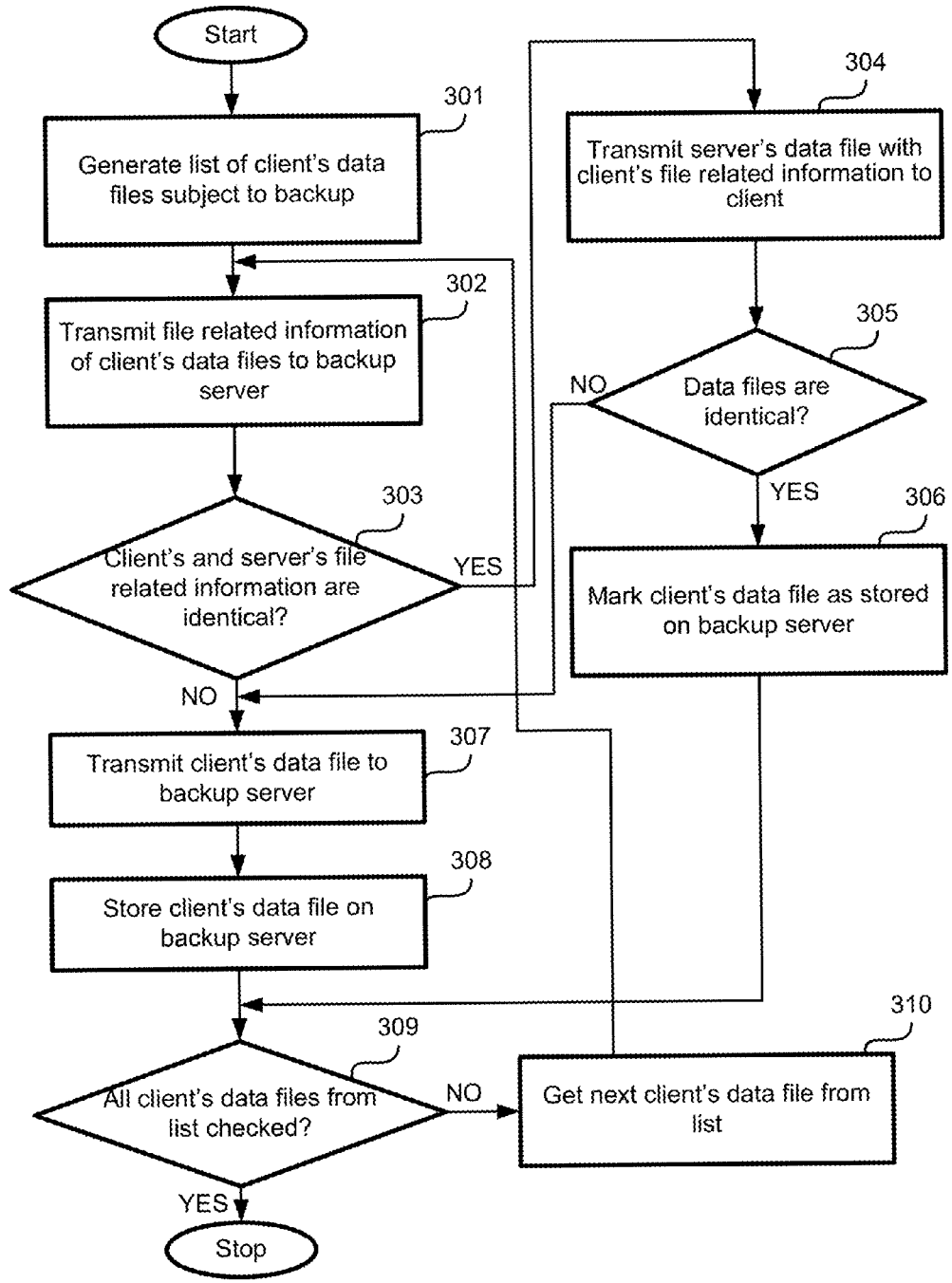
FIG. 3 illustrates a flowchart of a backup method with capacity optimization in accordance with the exemplary embodiment.

A flow chart of a backup process with optimized capacity is shown in FIG. 3. A set of data files that are subject to a backup is identified at step 301. At the same time the set of data files that can be accessed by the server at any time is identified. A list of files for a backup can be automatically generated by a special procedure. For example, dialog program may be used for generation or scheduling. In the first case, the user may start the procedure and ask for incremental backup, or folder backup, or user data backup, or ".doc" files backup, or the files can be manually selected by a user, etc. Then, the procedure forms the list and initiates data backup process.

In the second case, the procedure starts backing up automatically. An algorithm of predefining which data is to be backed up may be the same as discussed above.

In one exemplary embodiment, a backup utility can perform a systematic analysis of the backup objects stored on the backup server and establish a list of the objects that exist on the storage device. This list can include identifiers, attributes and other object related data. Such analysis can be performed for each backup object (i.e., file or directory).

The client computer sends a backup service request to a remote backup server. This request contains identification information of a backup object (see step 302). The identification information can be file attributes and/or special object identifiers. The identification information is needed for locating a backup object on the backup server.

The file-related information can be the file's attributes that are unique to the file or a file name. In case of a directory, the identification information can be a unique directory name. The file attributes can include the date of creation of the file as well as the read/write settings of the file. The backup server analyses the received client's file-related information and looks for the data file with the matching file-related information among the data files stored on the server.

If the received client's file-related information coincides with the server's data file (see step 303), the server's data file along with the client's file-related information are transmitted to the client computer (see step 304). According to the exemplary embodiment, the client's files can be located on the client computer and/or loaded from the network storage or storage medium (i.e., CD, DVD etc.).

Thus, comparison of the client's and server's data files can be performed either on the client computer or on the backup server. File comparison performed on the client is preferred due to availability of a fast high capacity channel from the server to the client. However, if it is not possible to load ISO files on the client computer, the required data files can be verified on the backup server.

If the server's and the client's data files are identical (see step 305), no data files are transmitted to the backup server and the client's data files are marked as stored on the server at step 306. The objects that are different from the data files stored on the backup server are transmitted from the client to the backup server at step 307 and stored thereon at step 308. As one data file from the client's backup list is analyzed and stored according to the backup procedure, there is a need to verify whether all of the client's data files from the list have been checked (see step 309). If the client's list is not empty, the next client's data file is taken from the list at step 310. When all of the data files are stored according to the backup procedure the backup process is completed.

The operations in accordance with the exemplary embodiment can be implemented in various ways. For example, most of the applications can be installed in a directory having a default name provided by a developer that can be used for initial identification. Alternatively, the names of folders or file names inside a folder can be used for application's version identification. Also, metadata related to application's version can be used.

This data is collected on the client side and is sent to the server for accessing corresponding object located on the server. If the object can be accessed by the server, further file identification can be performed. Further file verification is required since the initially installed files can be modified, patched or even corrupted by the time of client's backup request.

In the event several backup data items have the same corresponding hash value, then there are several options. One is to store only one of them (e.g., the first one that the system comes across). Another is to store all of them, and all the client data has to be transmitted, and stored with their corresponding identifiers. As yet a different possibility, two different hashes can be calculated (e.g., using a different/secondary hash function algorithm), and then compare these additional hash values on the client side. Such an event is generally expected to be fairly rare (and, in most cases, extremely rare). As another option, the file can be divided into multiple pieces, and a hash calculated for each individual piece for comparison.

As yet a further option, upon connection to the server, the client can inform the server of which client-side applications and operating system is installed on the client side. The server can then get the contents of the client side applications and operating system files for a particular client from a third party server, or from other clients using the same versions of the software applications and/or OS, or from distributives for these applications and OS files. This avoids having to transfer large amounts of data when the client is initially connected to the repository (or upon installation of a new application or an update, or a new version of the OS).

As will be further appreciated, the proposed system is particularly advantageous in asymmetrical bandwidth networks, although it can be implemented in symmetrical bandwidth networks as well. Additionally, it is particularly advantageous where clients and servers have different storage capacities.

Also, server data item comparison with the client data item can be performed on a packet-by-packet basis, where the packet may be an IP packet, or a block read from the disk, or similar. For example, two disks with identical files or pieces of files may store different blocks, because disk blocks may have different sizes. In this case, packets of separate files may need to be normalized before hashing. Normalization may be performed by superposing and dividing data of adjacent blocks, shifting and cutting block data or the like. The blocks themselves may be data items compared on a per-packet basis. Also, some metadata written it the file body may shift or corrupt separate pieces of data, so fuzzy logic criteria may be used to recognize this situation. For example, a file or inode identifier related to file or inode name and position may be embedded in the file body. In this situation, file hashes and hashes of some packets generated from files may be different.

However, most of the data of such a file may be used for saving storage or traffic capacity. For example, a floating set of data pieces may be established from the data item and optionally from data related to the data item. Data pieces related to files or other items may be compared using Boolean logic or fuzzy logic. If the results of the comparison says that two data items have something similar, one of the item may then be used for storage or traffic optimization, in whole or in part. For example, subsequent items from the set of similar data items may be stored with identifiers, incremental portions and some data pointed to other similar data items along with coincident parts identifiers.

Also comparison for any data piece, file or file piece mentioned above may be performed by direct comparison or by hash comparison or another similar one-way function generation.

The data item can be a set of hashes generated for recovering the data if the data items are similar or not, and only a part of generated hashes may used. Also, the comparison step may have several levels. For example, the data item may itself consist of several sub-data items and those data items also may be used for storage or traffic optimization if the entire data item itself is unsuitable. Also, those sub-data items may also be divided into smaller items. Note that fuzzy logic implementation can be used for data comparison, preferably for indication whether or not coincidence detection is worth providing. For a user data structure, associated data blocks are formed or indicated. Also, for similar data structures, similar data blocks are already calculated and/or saved on the backup storage. For the blocks and the data storage, hash functions are calculated and compared or otherwise processed using fuzzy logic. If the answer is "data structures are more similar then different," various mechanisms to detect coincidence are selected and executed. If the answer is "data structures are different or seem different", the user data structure is backed up. In some case, where exact coincidence is not required, fuzzy logic criteria may be reduced to a single criterion. For example, similar graphic or video data may be detected in this way. Also similar partial sequences of video file starting from similar keyframes may be used as an example of data item.

Additionally, permanent distributed storage may be used on the server such as network drives, Storage Area Network, etc.

Figure 4:
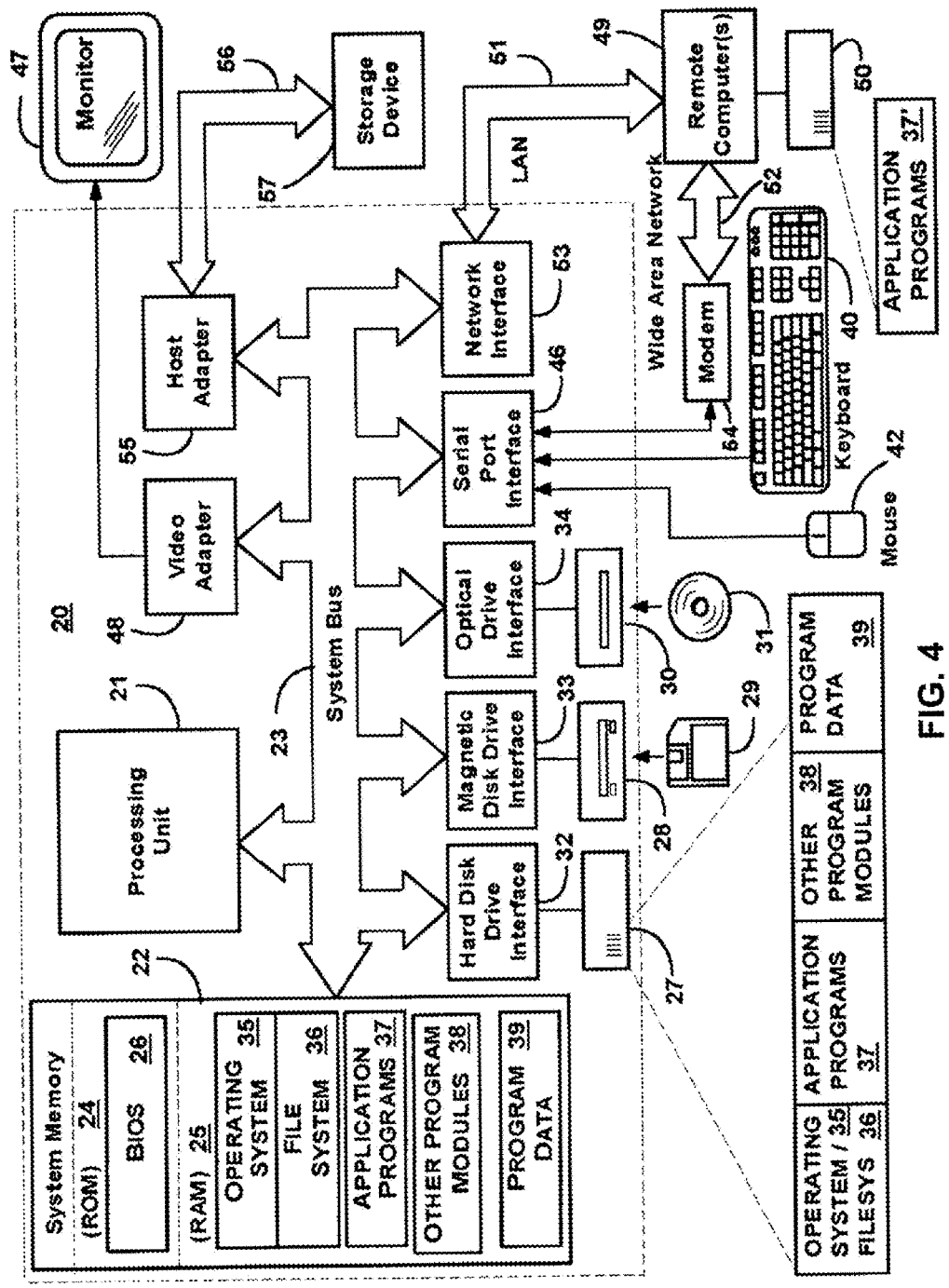
FIG. 4 illustrates an exemplary computer system that can be used for implementing a client or a server in accordance with the exemplary embodiment.

With reference to FIG. 4, an exemplary system for implementing the invention includes a general purpose computing device in the form of a computer or a server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the computer 20, such as during start-up, is stored in ROM 24.

The computer (or server) 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated in FIG. 4. The logical connections depicted in FIG. 4 include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method, system and computer program product have been achieved. In particular, it should be appreciated by those skilled in the art that the proposed method provides for efficient data backup with optimized capacity and traffic volume. It should also be appreciated that various modifications, adaptations, and alternative embodiments thereof may be made within the scope and spirit of the present invention. The invention is further defined by the following claims.

What is claimed is:

1. A method for data backup, the method comprising:
assigning identifiers to a client data item at a client;
generating a hash of the client data item at a client;
transmitting the hash to a server;
comparing the hash against hashes for data items belonging to multiple clients stored in a hash table at the server;
if an identical hash is found:
    transmitting a server data item corresponding to the hash and to the identifiers to the client;
    on the client, comparing the server data item with the client data item, and
    if the client data item and the server data item are identical, transmitting the identifiers to the server and storing the identifiers in a configurations repository; and
if the client data item and the server data item are different,
    transmitting the client data item to the server and storing the client data item in the data repository, the data item being assigned a unique identifier in a common namespace across multiple physical servers, for translation of a file pathname;
    transmitting the identifiers to the server and storing the identifiers in the configurations repository; and
if the identical hash is not found,
    transmitting the client data item to the server and storing the client data item in the data repository; and
    transmitting the identifiers to the server and storing the identifiers in the configurations repository.

2. The method of claim 1, wherein the identifiers also include file attributes and/or file metadata.

3. The method of claim 1, wherein comparing the server data item with the client data item is performed on a packet-by-packet basis, and wherein transmitting of the server data item is aborted after receipt of a first non-coincident packet at the client.

4. The method of claim 1, wherein the hash of the client data item is generated based on the entire file.

5. The method of claim 1, wherein the hash of the client data item is generated based on the entire group of blocks of an underlying file system that represents a portion of the file.

6. The method of claim 1, wherein the data repository is initially loaded with distributives of client side applications and operating system data, in unpacked form.

7. The method of claim 1, wherein, upon connection to the server, the client informs the server of which client side applications and operating system is installed on the client side.

8. The method of claim 7, wherein the server gets the contents of the client side applications and operating system files for a particular client from a third party server.

9. The method of claim 7, wherein the server gets the contents of the client side applications and operating system files for a particular client from other clients using the same software versions.

10. The method of claim 7, wherein the server gets the contents of the client side applications and operating system files for a particular client from distributives for these applications and OS files.

11. The method of claim 1, wherein the identifiers include metadata information of a backup application used to interface to the server.

12. The method of claim 1, further comprising using names of folders or file names inside a folder for identification of a backup application version used to interface t the server.

13. The method of claim 1, wherein if the files are identical, only the file attributes are transmitted to the server and stored in a user data configuration repository.

14. The method of claim 1, wherein client data is backed up to the server on a logical level, further comprising storing the client's data storage tree and links to files having corresponding hashes being already uploaded to the server.

15. The method of claim 1, wherein client data is backed up to the server on a physical level, further comprising using links to blocks of a backed up image of client storage, with the links pointing to blocks of previously uploaded files.

16. The method of claim 1, further comprising generating hashes of the file using an additional different hashing algorithm, and comparing the generated hashes to establish file identity.

17. The method of claim 1, further comprising dividing the file into multiple pieces, and calculating a hash for each piece for comparison.

18. The method of claim 1, further comprising normalizing packets that form the file prior to the hashing, the normalization including superposing and dividing data of adjacent blocks.

19. The method of claim 1, further comprising normalizing packets that form the file prior to the hashing, the normalization including shifting and cutting block data.

20. The method of claim 1, wherein the transmission is performed over an asymmetrical channel whose server-to-client transmission speed is higher than client-to-server transmission speed.

21. A system for data backup comprising:
 a client having a processor and a memory, the client being connected to a server;
  the client having client data items stored thereon;
  the server having server data items stored in a data repository thereon;
 a data repository located on the server, the data repository containing a hash table populated with hashes corresponding to server data items stored in the data repository,
 wherein the client transmits hashes of the client data items to the server and wherein the hashes of the client data items are compared against the hashes of the server data items stored in the hash table; and
 wherein, if a hash identical to the hash of the client data item, for multiple clients, is found, the corresponding server data item is transmitted to the client for verification, and
 the data item having assigned a unique identifier in a common namespace across multiple physical servers, for translation of a file pathname.

22. The system of claim 21, wherein the data repository is located on another client.

23. The system of claim 21, wherein the data repository is located on a remote storage device accessible over a network.

24. A method for data backup, the method comprising:
 (a) generating at a client a list of client data items for a backup on a server;
 (b) transmitting client data item related information to the server;
 (c) comparing the client data item related information against client data item related information stored on the server;
 if an identical data item related information is found among data items of multiple clients:
  transmitting a server data item corresponding to the client data item related information to the client;
  comparing the server data item with the client data item at the client, and
  if the client data item and the server data item are identical,
   marking the client data item as stored; and
  if the client data item and the server data item are different,
   transmitting the client data item to the server and storing the client data item on the server;
 if the identical data item related information is not found,
  transmitting the client data item to the server and storing the client data item on the server,
 the data item having assigned a unique identifier in a common namespace across multiple physical servers, for translation of a file pathname; and
 repeating steps (b)-(c) for all the data items from the list of client data items.

25. The method of claim 24, wherein the client data-related information is any of:
 a file name;
 a directory name;
 file settings; and
 a date of creation of the file.

26. A non-transitory computer useable storage medium having computer program logic stored thereon for executing on a processor for implementing the steps of claim 24.

27. The computer useable storage medium of claim 26, wherein the computer storage medium is a network drive.

28. The method of claim 24, wherein the client and the server are connected using an asymmetric connection with different upload and download speeds.

29. The method of claim 28, wherein the asymmetric connection is an ADSL connection.

30. The method of claim 24, wherein the client data item is a file.

31. The method of claim 24, wherein the client data item is a group of blocks.

32. A method for data backup, the method comprising:
 assigning identifiers to a client data item at a client;
 generating a hash of the client data item at a client;
 transmitting the hash to a server;
 comparing the hash against a list of hashes at the server;
 if an identical hash for data items belonging to multiple clients is found in the list:
  (i) transmitting, to the client, a server data item corresponding to the hash;
  (ii) on the client, comparing the server data item with the client data item, and
  (iii) if the client data item and the server data item are identical, notifying the server; and
  (iv) if the client data item and the server data item are different, transmitting the client data item to the server, storing the client data item in the data repository;
  (v) optionally transmitting the identifiers to the server and storing the identifiers in the configurations repository; and
 if the identical hash is not found,
  transmitting the client data item to the server and storing the client data item in the data repository and storing the hash value in the list of hashes, the data item having assigned a unique identifier in a common namespace across multiple physical servers, for translation of a file pathname; and
  (vi) optionally transmitting the identifiers to the server and storing the identifiers in the configurations repository.

33. The method of claim 32, wherein the data item is a file, and wherein the file is divided into multiple blocks, with hashes calculated for each block, and then compared to establish identity.

34. The method of claim 32, wherein fuzzy logic is used to compare identity of the server data item and the client data item.

* * * * *